(12) United States Patent
Wang et al.

(10) Patent No.: US 9,001,913 B2
(45) Date of Patent: Apr. 7, 2015

(54) POWER SAVING IDLE DATA TRANSMISSION UNITS

(71) Applicant: Futurewei Technologies, Inc., Plano, TX (US)

(72) Inventors: Ruxiang Wang, San Jose, CA (US); Guozhu Long, Fremont, CA (US); Yan Zhang, Shenzhen (CN); Amir H. Fazlollahi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/018,907

(22) Filed: Sep. 5, 2013

(65) Prior Publication Data

US 2015/0063476 A1    Mar. 5, 2015

(51) Int. Cl.
*H04L 23/02* (2006.01)
*H04L 5/12* (2006.01)
*H04M 11/06* (2006.01)
*H04L 27/26* (2006.01)

(52) U.S. Cl.
CPC .......... *H04M 11/062* (2013.01); *H04L 27/2627* (2013.01)

(58) Field of Classification Search
CPC .... H04L 1/1861; H04L 1/006; H04L 27/2601
USPC .................. 375/261, 259, 262, 265, 278, 284
See application file for complete search history.

(56) References Cited

U.S. PATENT DOCUMENTS

| | | | |
|---|---|---|---|
| 5,113,412 A * | 5/1992 | Goldstein | 375/261 |
| 6,097,764 A * | 8/2000 | McCallister et al. | 375/298 |
| 6,134,273 A * | 10/2000 | Wu et al. | 375/261 |
| 6,704,353 B1 * | 3/2004 | McCarty et al. | 375/227 |
| 8,422,579 B1 | 4/2013 | Morais | |
| 8,718,205 B1 * | 5/2014 | Morais | 375/341 |
| 8,750,434 B2 * | 6/2014 | Jung et al. | 375/341 |
| 2001/0017900 A1 * | 8/2001 | Schelstraete | 375/265 |

(Continued)

FOREIGN PATENT DOCUMENTS

EP    2587754 A1    5/2013

OTHER PUBLICATIONS

Wang, R., et al. U.S. Appl. No. 13/682,842, filed Nov. 21, 2012, "Traffic-Adaptive Repeated Transmission," 54 pgs.

(Continued)

*Primary Examiner* — Qutbuddin Ghulamali
(74) *Attorney, Agent, or Firm* — Conley Rose, P.C.; Grant Rodolph; William H. Dietrich

(57) ABSTRACT

A method implemented in a multicarrier transmission system, the method comprising generating a plurality of constellation points by using one or more constellation mappers to map a plurality of special data sequences for an idle data transmission unit (IDTU), wherein the plurality of special data sequences are computed prior to the mapping such that the plurality of constellation points are essentially inner constellation points, wherein each of the inner constellation points resides in a constellation diagram that corresponds to one of a plurality of subcarriers used by the IDTU, and wherein the constellation diagram comprises a number of inner constellation points and a number of outer constellation points, with the inner constellation points being closer from an origin of the constellation diagram than the outer constellation points, and transmitting the plurality of constellation points.

20 Claims, 10 Drawing Sheets

(56) References Cited

U.S. PATENT DOCUMENTS

| | | | |
|---|---|---|---|
| 2003/0223507 A1* | 12/2003 | De Gaudenzi et al. | 375/279 |
| 2008/0292010 A1 | 11/2008 | Wernears | |
| 2010/0142600 A1 | 6/2010 | Ahrndt et al. | |
| 2011/0051825 A1 | 3/2011 | Tao et al. | |
| 2012/0324262 A1* | 12/2012 | Chang et al. | 713/320 |

OTHER PUBLICATIONS

"Series G: Transmission Systems and Media, Digital Systems and Networks—Digital Sections and Digital Line System—Access Networks—Asymmetric Digital Subscriber Line Transceivers 2 (ADSL2)—Annex C: Specific Requirements for an ADSL System Operating in the Same Cable as ISDN as Defined in Appendix III of Recommendation ITU-T G.961," ITU-T G.992.3 Annex C (Apr. 2009), 296 pgs.

"Series G: Transmission Systems and Media, Digital Systems and Networks—Digital Sections and Digital Line System—Access Networks—Asymmetric Digital Subscriber Line Transceivers 2 (ADSL2)," ITU-T G.992.3 (Apr. 2009), 404 pgs.

"Series G: Transmission Systems and Media, Digital Systems and Networks—Digital Sections and Digital Line System—Access Networks—Asymmetric Digital Subscriber Line Transceivers 2 (ADSL2)—Extended Bandwith (ADSL2 plus)—Annex C: Specific Requirements for an ADSL System Operating in the Same Cable as ISDN as defined in Appendix III of Recommendation ITU-T G.961," ITU-T G.992.5 Annex C (Jan. 2009), 66 pgs.

"Series G: Transmission Systems and Media, Digital Systems and Networks—Digital Sections and Digital Line System—Access Networks—Asymmetric Digital Subscriber Line Transceivers 2 (ADSL2)—Extended Bandwith (ADSL2 plus)," ITU-T G.992.5 (Jan. 2009), 110 pgs.

"Series G: Transmission Systems and Media, Digital Systems and Networks—Digital Sections and Digital Line System—Access Networks—Very High Speed Digital Subscriber Line Transceivers 2 (ADSL2)," ITU-T G.993.2 (Dec. 2011), 376 pgs.

"Series G: Transmission Systems and Media, Digital Systems and Networks—Digital Sections and Digital Line System—Access Networks—Improved Impulse Noise Protection for DSL Transceivers," ITU-T G.998.4 (Jun. 2010), 78 pgs.

Foreign Communication From A Counterpart Application, PCT Application No. PCT/CN2014/085330, International Search Report dated Nov. 26, 2014, 7 pages.

Foreign Communication From A Counterpart Application, PCT Application No. PCT/CN2014/085330, Written Opinion dated Nov. 26, 2014, 6 pages.

\* cited by examiner

POWER SAVING IDLE DATA TRANSMISSION UNITS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern digital subscriber line (DSL) communication systems may have fixed connection rates. When an actual user data rate of a subscriber line is lower than its connection rate, a transmission system may add idle cells or codewords to keep a constant physical media dependent (PMD) transmission rate. As user traffic may be bursty on the subscriber line, the transmission of idle cells may sometimes consume relatively significant power in the transmission system.

Whether a data transmission unit (DTU) (sometimes also referred to as a data transfer unit) comprises user data or just idle cells, when a receiver detects an error or corruption, it may request retransmission. When the user data rate is low, potentially many idle cells may be inserted into a DTU, consequently power may be wasted on transmitting the idle cells. For example, in a DSL system, in case a discontinuous transmission mode is not utilized or not supported, idle DTUs (IDTUs) may be added to maintain a constant transmission frequency of discrete multi-tone (DMT) symbols.

SUMMARY

In one embodiment, the disclosure includes a method implemented in a multicarrier transmission system, the method comprising generating a plurality of constellation points by using one or more constellation mappers to map a plurality of special data sequences for an idle data transmission unit (IDTU), wherein the plurality of special data sequences are computed prior to the mapping such that the plurality of constellation points are essentially inner constellation points, wherein each of the inner constellation points resides in a constellation diagram that corresponds to one of a plurality of subcarriers used by the IDTU, and wherein the constellation diagram comprises a number of inner constellation points and a number of outer constellation points, with the inner constellation points being closer from an origin of the constellation diagram than the outer constellation points, and transmitting the plurality of constellation points.

In another embodiment, the disclosure includes an apparatus comprising a processor configured to generate a plurality of constellation points by using one or more constellation mappers to map a plurality of special data sequences for an IDTU, wherein the plurality of special data sequences are computed, prior to the mapping, such that the plurality of constellation points consist essentially of inner constellation points, wherein each of the inner constellation points resides in a constellation diagram that corresponds to one of a plurality of subcarriers used by the IDTU, and wherein the constellation diagram comprises a number of inner constellation points and a number of outer constellation points, with the inner constellation points being closer from an origin of the constellation diagram than the outer constellation points, and a transmitter coupled to the processor and configured to transmit the plurality of constellation points.

In yet another embodiment, the disclosure includes a computer program product comprising computer executable instructions stored on a non-transitory computer readable medium such that when executed by a processor cause a network device to receive a DTU comprising a plurality of constellation points corresponding to a plurality of subcarriers used by the DTU, wherein at least one of the plurality of constellation points is an inner constellation point of a constellation diagram, wherein a data sequence was computed so as to map to the inner constellation point using a constellation mapper, wherein the constellation diagram comprises the inner constellation point and a number of outer constellation points that are farther from an origin point of the constellation diagram than the inner constellation point, demap the plurality of constellation points to generate a plurality of data sequences, determine that the DTU is an IDTU, and discard the IDTU.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Although DSL connections may typically run at a fixed rate, depending on the application, user data rates in DSL service may vary significantly. Thus, when a user data rate is relatively low or idle, a transmitter of the user data may fill in a suitable number of idle or dummy bits such that the transmitter and a corresponding receiver may still run at full speed. As a result, idle data traffic may take a significant portion of transmission time and power. When dummy bits are filled, idle DTUs (also referred to as dummy DTUs) may be formed. IDTUs may not carry any useful data and may be discarded by the receiving side.

This disclosure may minimize the consumption of power in transmitting IDTUs so that, on average, a total transmission power may be reduced. Specifically, the base content of an IDTU may be set or pre-calculated in a multicarrier transmission system such that, for essentially all or most of subcarriers used by the IDTU, idle data can be mapped to inner constellation points in respective constellation diagrams. Since transmitting inner constellation points, especially four innermost constellation points, may consume less power than outer constellation points, the overall transmission power may be reduced. In an embodiment, to resemble the procedure in a receiver and thereby achieve inner constellation points, a plurality of special data sequences, which are used by a plurality of subcarriers or tones with more than two bits, may be computed in the transmission system based on a target constellation data array. The target constellation data array may be made of the four innermost constellation points. The special data sequences may be inserted into an IDTU and transmitted as constellation points. Once the IDTU is received by a receiving system, it may be detected using various techniques and thereafter discarded. In DSL operation, IDTU may be used when the connection is totally idle, or when the user data rate is lower than nominal. Thus, the power saving techniques disclosed herein may benefit a large percentage of operation time. The operation on a transmission side may basically remain transparent to a receiving side, so that power saving may be achieved in the transmitter seamlessly.

Figure 1:
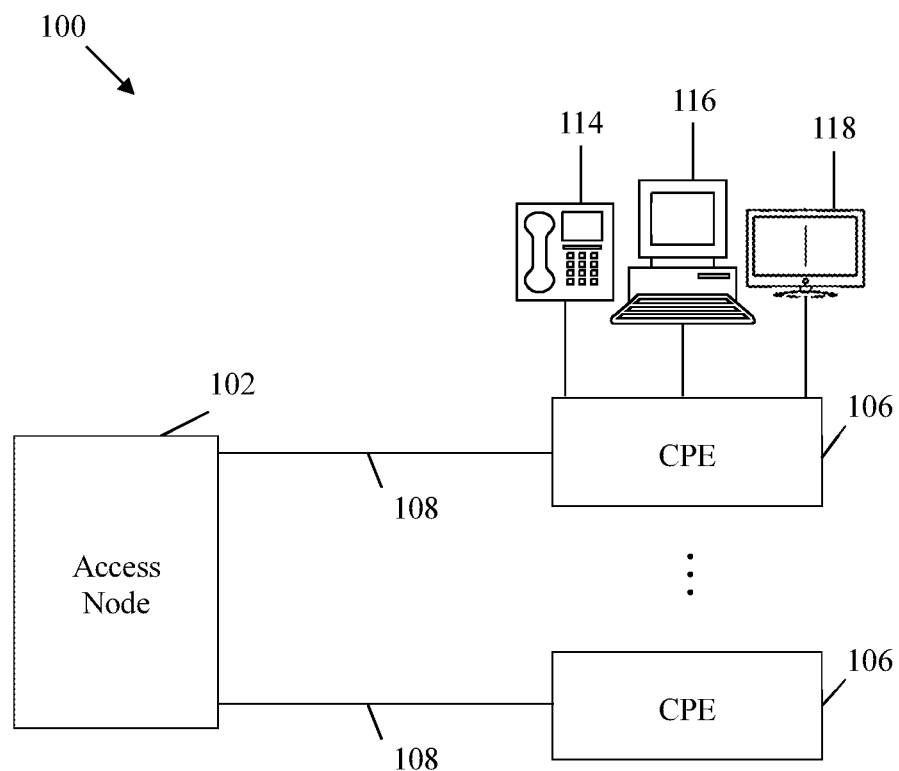
FIG. 1 illustrates an embodiment of a digital subscriber line (DSL) system.

FIG. 1 illustrates an embodiment of a DSL system 100, wherein disclosed data communication schemes may operate. The DSL system 100 may be an ADSL2 system, an ADSL2+ system, a VDSL2 system, or any other DSL system (e.g., systems being or to be defined by the International Telecommunication Union Telecommunication Standardization Sector (ITU-T) G.hn or G.fast standard). The DSL system 100 may comprise an access node or point 102 and a plurality of customer premises equipment (CPEs) 106 coupled to the access node 102 via a plurality of subscriber lines 108.

The access node 102 may be implemented as an exchange, a DSL access multiplexer (DSLAM), a cabinet, a remote terminal (RT), a distribution point, or any other suitable network device that interacts with the CPEs 106. For instance, the access node 102 may be a server located at a central office (CO) and may comprise switches and/or splitters which may couple the subscriber lines 108. The access node 102 may further comprise at least one DSL transmitter/receiver (transceiver), which facilitates the communication between the access node 102 and the CPEs 106 over the subscriber lines 108. In an embodiment, the DSL transceiver may comprise a forward error correction (FEC) codeword generator that generates FEC data, an interleaver that interleaves the transmitted data across a plurality of sub-carriers, or both. For instance, the DSL transceiver may use a discrete multi-tone (DMT) line code that allocates a plurality of bits for each sub-carrier or tone in each DMT symbol. The DMT may be adjusted to various channel conditions that may occur at each end of a subscriber line. The DSL transceiver in the access node 102 may be configured to transmit data at similar or different rates for each subscriber line 108.

The subscriber lines 108 may be made of any suitable material such as copper wire or optical fiber. At least some of the subscriber lines 108 may be bundled in a binder. Additionally, for access to another network, the DSL system 100 may optionally comprise a network management system (NMS) and a public switched telephone network (PSTN), both of which may be coupled to the access node 102. Further, the DSL system 100 may be modified to include splitters, filters, management entities, and various other hardware, software, and functionality.

In an embodiment, the CPEs 106 may be located at the customer premises, where at least some of the CPEs 106 may be coupled to a telephone 114, a computer 116, and/or a television 118. The telephone 114 may be implemented as hardware, software, firmware, or combinations thereof that generates, processes, and receives voice or other voice-band signals. The CPE 106 may comprise a switch and/or a splitter, which may couple the subscriber lines 108 and the telephone 114, the computer 116, and the television 118. The CPE 106 may also comprise a DSL transceiver to exchange data between the CPE 106 and the access node 102 via the subscriber line 108.

Depending on whether data communication is in an upstream direction or a downstream direction, each of the network devices in the DSL system 100 may serve as a transmission side, a receiving side, or both. In the upstream direction, for example, a DTU may be transmitted from a CPE 106 (transmission side) to the access node 102 (receiving side). In the downstream direction, for another example, a DTU may be transmitted from the access node 102 (transmission side) to a CPE 106 (receiving side).

Figure 2:
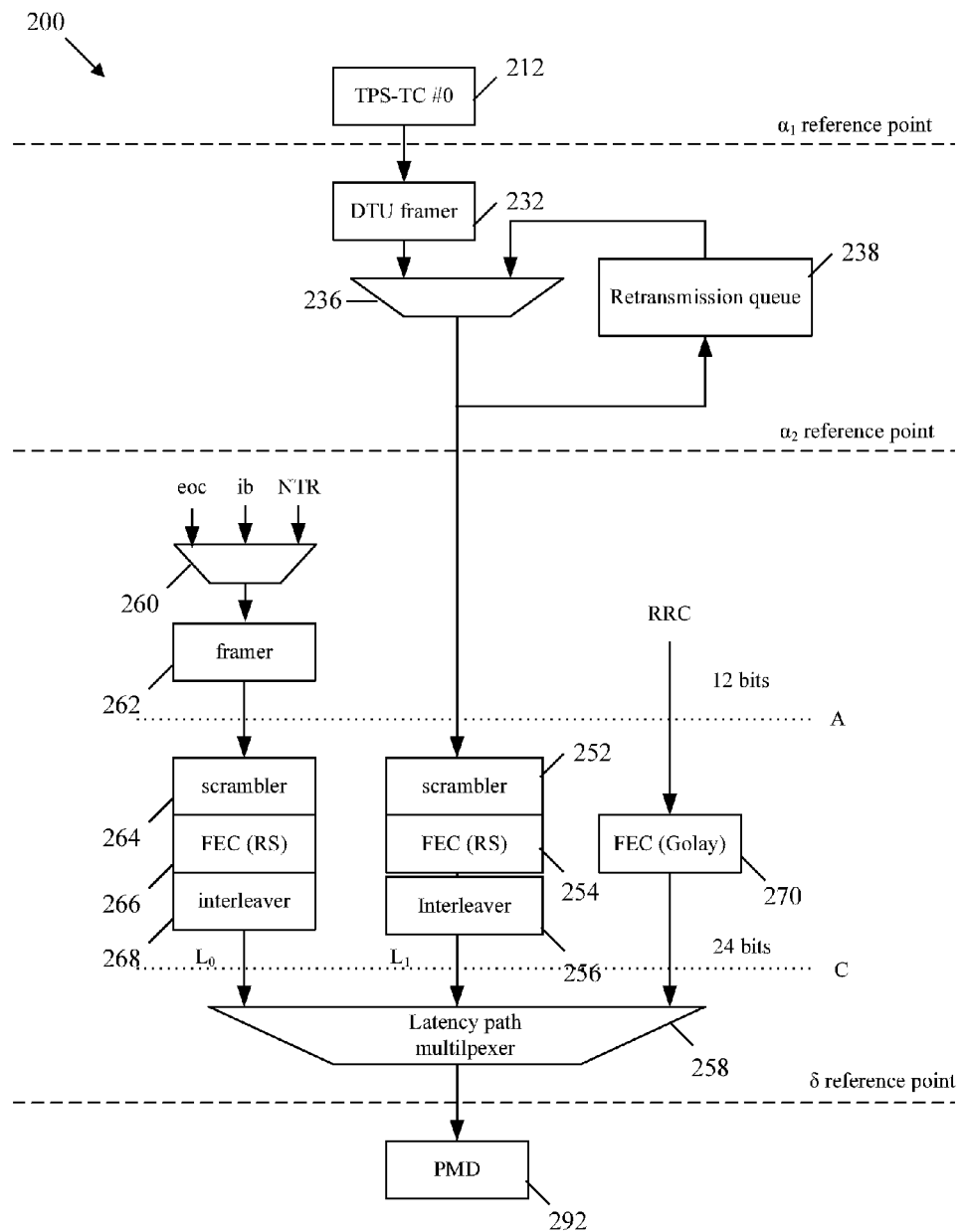
FIG. 2 illustrates an exemplary reference model of a multicarrier transmission system.
Figure 6:
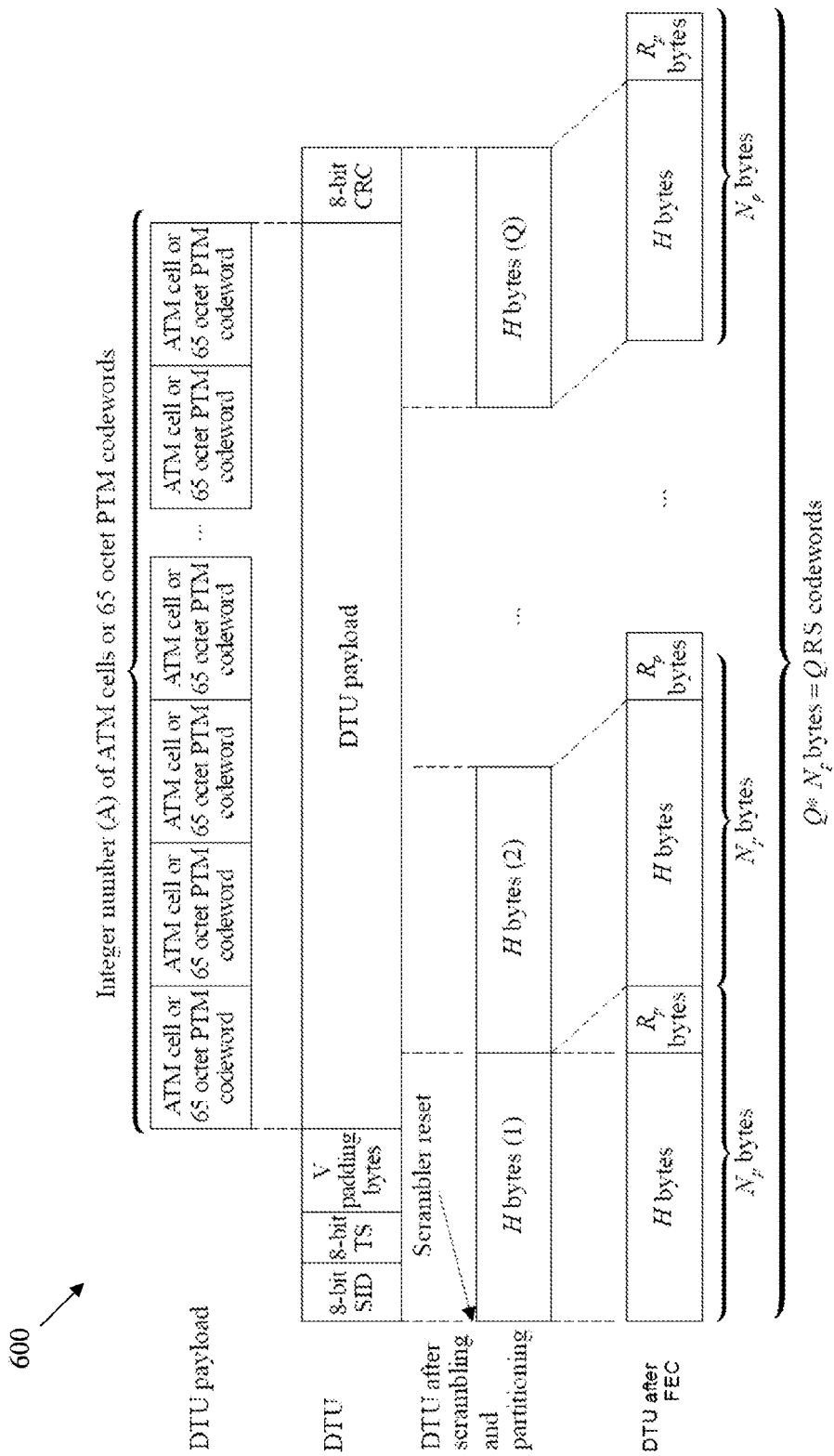
FIG. 6 illustrates an exemplary structure of a data transmission unit (DTU).

FIG. 2 illustrates an examplary reference model 200 of a multicarrier transmission system, which may be implemented in the DSL system 100 (e.g., as part of the access node 102 and/or the CPEs 106). The reference model 200 is also shown in FIG. 6-1 of the ITU-T G.998.4 Recommendation entitled "Improved Impulse Noise Protection (INP) for DSL Transceivers", which is incorporated herein by reference.

The reference model 200 may correspond to a physical (PHY) layer and may be grouped or classified into several sublayers, which are separated by reference points. For example, the sublayers may include a transport protocol specific-transmission convergence (TPS-TC) sublayer, a retransmission sublayer coupled to the TPS-TC sublayer via an $\alpha_1$ reference point, a physical media specific-transmission convergence (PMS-TC) sublayer coupled to the retransmission sublayer via an $\alpha_2$ reference point, and a physical media dependent (PMD) sublayer coupled to the PMS-TC sublayer via a $\delta$ reference point. Such sublayers may be included in CO and/or CPE transceivers. Further, sublayer structures may vary depending on the application. For example, sometimes the retransmission sublayer may be considered or defined as part of the PMS-TC sublayer.

In the reference model 200, the TPS-TC sublayer may comprise a TPS-TC module 212. In the downstream direction, the TPS-TC module 212 may use a bearer channel (#0). The TPS-TC module 212 may receive user data from a network source (e.g., the Internet) and process the user data using a TPS-TC function. Various types of TPS-TC functions may be used in the TPS-TC module 212, including, but not limited to, synchronous transfer mode (STM), asynchronous transfer mode (ATM), and packet transfer mode (PTM). After processing, the user data may be assembled or packed into one or more DTUs, which may then be forwarded to a DTU framer 232. The DTU framer 232 may be located in the retransmission sublayer and coupled to the TPS-TC module 212, e.g., via a switch. The DTU framer 232 may further process the DTU, e.g., to add other information. Depending on the type of TPS-TC function implemented in the TPS-TC module 212, each DTU generated by the TPS-TC module 212 may comprise a plurality of AMT cells, a plurality of PTM codewords, or a plurality of Reed Solomon (RS) codewords. Further, after the DTU framer 232, each DTU may comprise additional octets carrying information such as a sequence identifier (SID), a time stamp (TS), overhead for a cyclic redundancy check (CRC), and padding bytes.

DTUs processed by the DTU framer 232 may be fed into a retransmission multiplexer 236. In an embodiment, the retransmission multiplexer 236 may select either a DTU from the DTU framer 232 or a DTU from a retransmission queue 238 for transmission over the $\alpha_2$ reference point. The retransmission queue 238 is coupled to the retransmission multiplexer 236. A retransmission or repeated transmission control unit may control transmission by setting a DTU to be repeatedly transmitted a plurality of times. For example, if new user data has become available in the TPS-TC module 212, the new user data may then be packed into one or more new DTUs and transmitted. Otherwise, if no new user data is available in the TPS-TC module 212, one or more IDTUs, each of which at least partially comprising idle cells, may be transmitted until new user data arrives at the TPS-TC module 212. Furthermore, retransmission may be enabled in upstream and/or downstream directions.

During transmission of a DTU, the retransmission multiplexer 236 may feed the DTU into a scrambler module or unit 252. The DTU may then go through error correction in a forward error correction (FEC) unit 254, which may use RS coding. Then, the DTU may be processed by an interleaver 256. Afterwards, the DTU may be fed into a latency path multiplexer 258, which combines data from multiple paths and/or channels. The PMS-TC sublayer may comprise two latency paths, path 0 (denoted as $L_0$) and path 1 (denoted as $L_1$), and a retransmission request channel (RRC). The latency path 0 may contain overhead data, while the latency path 1 may contain DTUs (i.e., octets coming over the $\alpha_2$-reference point).

In the latency path 0, overhead information, including an embedded operations channel (eoc), an indicator bit (ib), and a network time reference (NTR), may be combined by an overhead multiplexer 260. Then, the overhead channel may be framed by a framer 262, which feeds into a scrambler unit 264. The scrambler unit 264 is coupled to a FEC unit 266, which is also coupled to an interleaver 268.

On the other hand, the RRC may carry an acknowledgement (ACK) or a negative acknowledgement (NACK) for received DTUs. In addition, the RRC may be encoded in an FEC unit 270, which uses an extended binary Golay code. The output from the two latency paths and the RRC are multiplexed by the latency path multiplexer 258 into a data structure that is transferred to the PMD module 292 over the δ-reference point. After being processed by the PMD module 292, the DTU may be sent out of the reference model 200 as, e.g., digital multi-tone (DMT) symbols.

It should be noted that the modules illustrated in FIG. 2 may only include a portion of all necessary modules in a multicarrier transmission system and the modules may vary depending on the application. Accordingly, other modules or units, such as transmitter, receiver, analog front end, line driver, etc., may be incorporated into the reference model 200 wherever appropriate.

Figure 3:
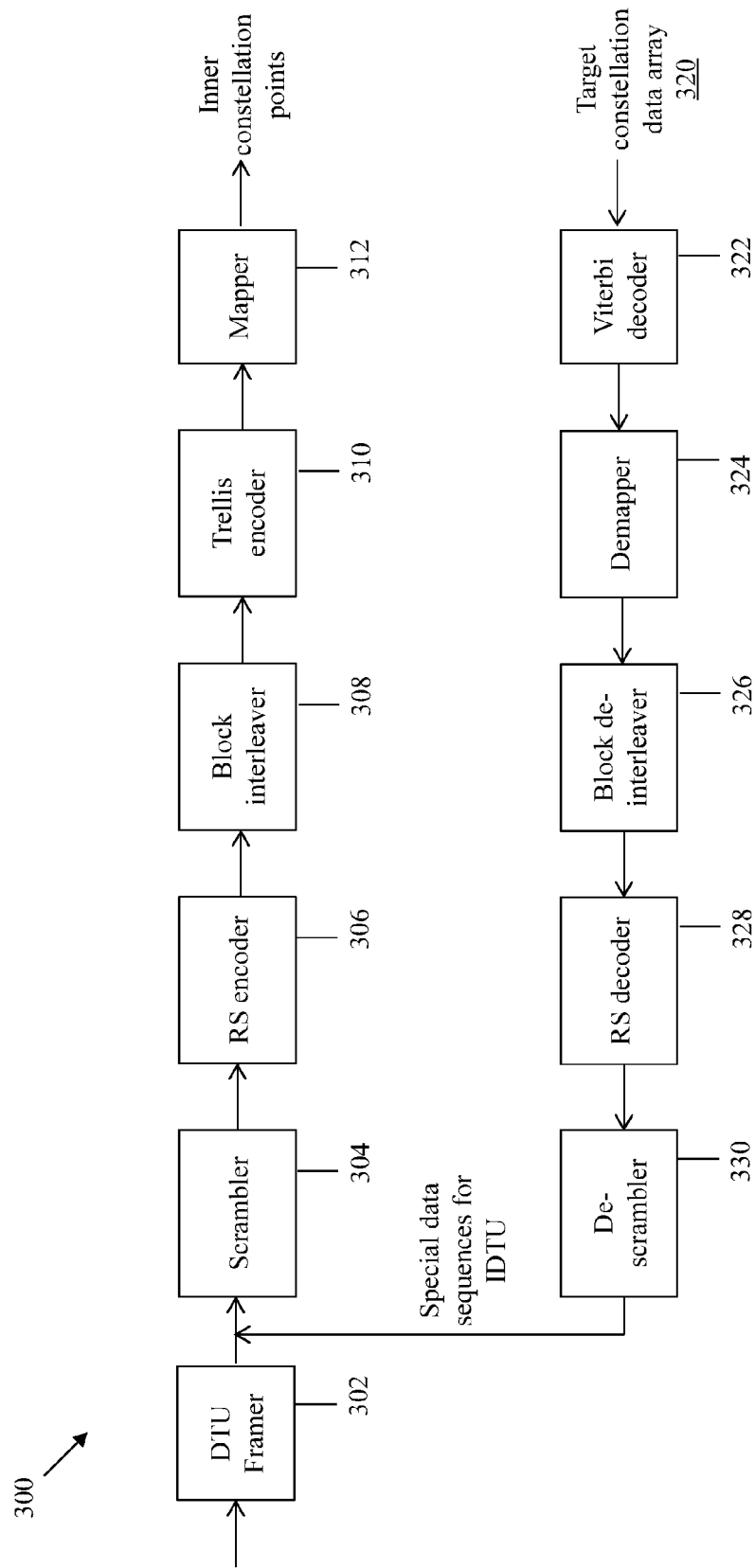
FIG. 3 illustrates an embodiment of a multicarrier transmission system.

FIG. 3 illustrates an embodiment of a multicarrier transmission system 300, in which disclosed power-saving IDTU (PSIDTUs) may be generated. One of ordinary skill in the art will recognize that some aspects in the multicarrier transmission system 300 are similar to the reference model 200, thus further description will focus on aspects not yet covered. In use, when the TPS-TC sublayer of a multicarrier transmission system (e.g., reference model 200 shown in FIG. 2) is not receiving cells or codewords containing user data, the TPS-TC sublayer may send idle cells or codewords to the PMS-TC sublayer of the transmission system. Upon receiving the idle cells or codewords, a DTU framer 302 located in the PMS-TC sublayer may form an IDTU containing the received idle cells or codewords.

It should be understood that an IDTU or PSIDTU as defined herein may comprise partially or entirely idle cells or codewords. For example, according to the G.fast standard, it is possible for one or more idle cells or frames to be included in a DTU, together with one or more user cells or data frames. The idle frame may be placed as the last frame of the DTU. Some of the subcarriers or tones may carry specially computed idle data, while other tones may carry normal user data. Thus in certain situations, a partial IDTU may still be considered an IDTU.

An IDTU may be processed in sequence by a scrambler 304, an RS encoder 306, and a block interleaver 308, after which the IDTU may be sent, as part of a path 1 data stream, to the PMD sublayer of the transmission system. Note that RRC and overhead channel data (in path 0) may also be sent from the PMS-TC sublayer to the PMD sublayer along with the IDTU. In the PMD sublayer, DMT data may pass through a Trellis encoder 310, and then be mapped by a mapper 312 to become a set of a constellation points. Each constellation point may correspond to a subcarrier of the DMT symbol. Although not shown in FIG. 3, the DMT symbol may be further converted to the time domain, and then transmitted from the transmission system 300 to a receiving end of the subscriber line.

In a multicarrier transmission system, the transmission of idle data traffic (cells or codewords mapped to constellation points) may consume a significant portion of transmission time and/or power, which may be the result of a number of factors. For example, a subscriber line coupled to the multicarrier transmission system may have a fixed connection data rate, thus the multicarrier transmission system may need to remain on and keep transmitting idle traffic when there is no or little user traffic. Further, due to the burst nature of the subscriber line, transmission of idle cells of IDTUs may not be avoided. From a receiver's perspective, the idle data traffic may be meaningless or useless, and may be discarded once received. Thus, one may wish to minimize the time and/or power used for transmission of IDTUs.

Conventional mechanisms of IDTU transmission have various issues or drawbacks. For example, in one conventional mechanism, idle cells or codewords are initially configured to contain all 0's or all 1's. Even though the idle cells or codewords may be all 0's or all 1's, after processing by a scrambler (and other modules such as an RS encoder), the idle data may be randomized such that its corresponding constellation points, generated by a mapper, may become random constellation points in a constellation diagram. The transmission of random constellation points may not be the most power-efficient, which will be further discussed below. In another conventional mechanism proposed by METANOIA Inc., idle data for one or more tones are mapped to the origin, i.e., (0,0) which is not a constellation point, of a constellation diagram. The transmitter may remain quiet since a (0,0) constellation has no signal amplitude. Consequently, both transmission and receiving functional modules may be affected and normal DSL operation may be interrupted.

In comparison, the idle data sequences for an IDTU may be constructed herein such that the constellation points generated from the idle data are essentially inner constellation points in a constellation diagram. Since the inner constellation points may require relatively less power to transmit, IDTUs constructed herein may help lower the transmission power consumed by a multicarrier transmission system. In addition, using embodiments disclosed herein, both transmission and receiving functional modules may work seamlessly and compliant to existing standards.

Figure 4:
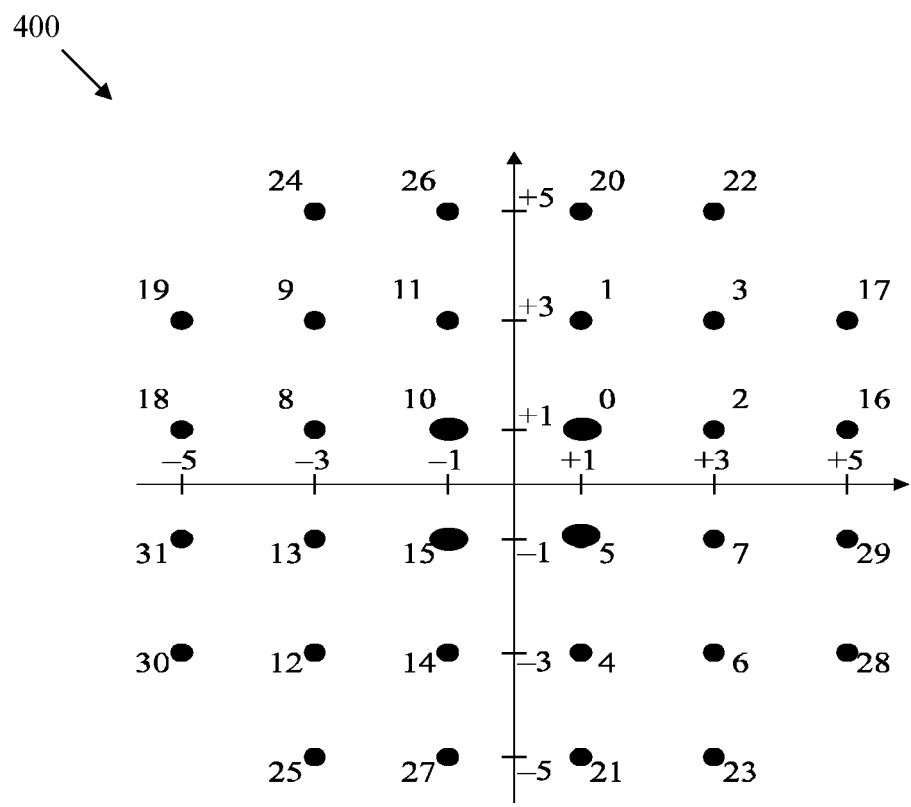
FIG. 4 illustrates an embodiment of an exemplary constellation diagram.

To better understand power saving by mapping idle data bits to inner constellation points, refer to FIG. 4, which is an examplary constellation diagram 400. The constellation diagram 400 comprises 32 constellation points (numbered from 0-31), which corresponds to a bit loading of five (that is, each data sequence on this tone comprises five bits, thus $2^5=32$). In general, a constellation diagram corresponding to a bit loading of N may comprise $2^N$ constellation points, where N is an integer greater than one. Each constellation point may be mapped from a different N-bit data sequence. The constellation points in the constellation diagram 400 may be divided or classified into inner constellation points and outer constellation points. In an embodiment, the inner constellation points comprises the four innermost points, e.g., points (1,1), (-1, 1),(-1,-1) and (1,-1) which are shown as oval points in FIG. 4.

For any bit loading that is at least three, the corresponding constellation diagram may comprise a number of inner constellation points and a number of outer constellation points, with the inner constellation points being closer from an origin of the constellation diagram than the outer constellation points. In some embodiments, the inner constellation points refer to some or all of the innermost constellation points, e.g., (±1, ±1). However, it should be understood that the inner constellation points may include other points as well, and that the inner constellation points may sometimes not necessarily include any of the innermost points. In fact, any point may be regarded as an inner point, as long as the point is closer to the origin of the constellation diagram than at least one other point. For example, the constellation point denoted as 3 in FIG. 4 may be regarded as an inner point as it is closer to the origin than constellation points 17 and 22. Thus, it is possible for a data sequence to be mapped herein to the constellation point 3.

For a tone with more than two bits loading, the four data sequences corresponding to the four innermost points (1,1), (-1,1),(-1,-1) and (1,-1) may require the least power to transmit. For example, Table 1 shows, for different bit loadings, the average power needed to transmit random constellation points and the amount of power saving realized by transmitting innermost constellation points. Take the bit loading of 5 (corresponding to the constellation diagram 400) as an example, and suppose the power needed to transmit an outermost constellation point is 34. Computation reveals that the average power needed to transmit random constellation points may be 20, and the power needed to transmit an innermost point is merely 2, which equals a power saving of 10 dB or (20−2)/20=90%.

TABLE 1

A comparison between transmitting random constellation points and innermost constellation points

| Bit loading | Average Power | Power-saving in decibel (dB) per tone |
|---|---|---|
| 1 | 2 | 0 |
| 2 | 2 | 0 |
| 3 | 6 | 4.77 |
| 4 | 10 | 6.99 |
| 5 | 20 | 10.00 |
| 6 | 42 | 13.22 |
| 7 | 82 | 16.13 |
| 8 | 170 | 19.29 |
| 9 | 330 | 22.17 |
| 10 | 682 | 25.33 |
| 11 | 1322 | 28.20 |
| 12 | 2730 | 31.35 |
| 13 | 5290 | 34.22 |
| 14 | 10922 | 37.37 |
| 15 | 21162 | 40.25 |

In practice, power consumption by a line driver may be the most significant portion of the overall power consumption in a multicarrier transmission system. Thus, power saving achieved at the line driver may significantly benefit the overall performance of the multicarrier transmission system.

Based on Table 1, if we assume an average bit loading of 8 (that is, 8 bits on average for all data sequences) across the tones, transmission mechanisms disclosed herein may reduce alternating current (AC) power at the line driver by about 19 decibel (dB), which equals 10 times reduction in power. In this example, further assume the line driver consumes 500 milliwatts (mW). If the line driver is a class AB line driver, power efficiency may be about 20%. In this case, the reduction in total power consumption in the line driver may be about 90 mW (that is, power saving of 90/500=18%). Otherwise, if the line driver is a class H line driver, power efficiency may be about 40%. In this case, the reduction in total power consumption in the line driver may be about 180 mW (that is, power saving of 180/500=36%).

Figure 5A:
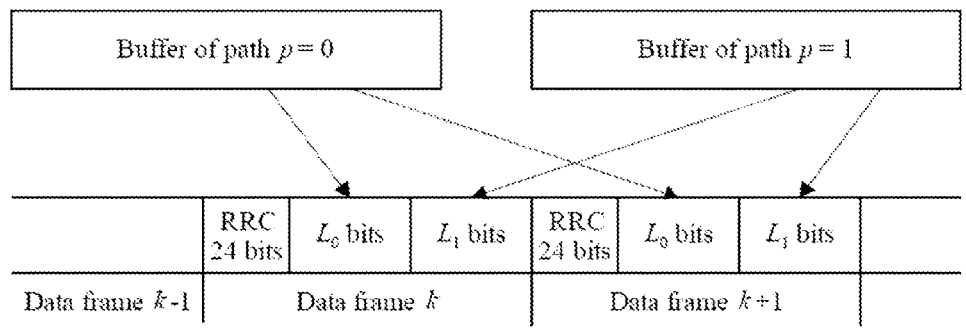
FIGS. 5A and 5B illustrate different multiplexing of a retransmission request channel (RRC) and latency paths.
Figure 5B:
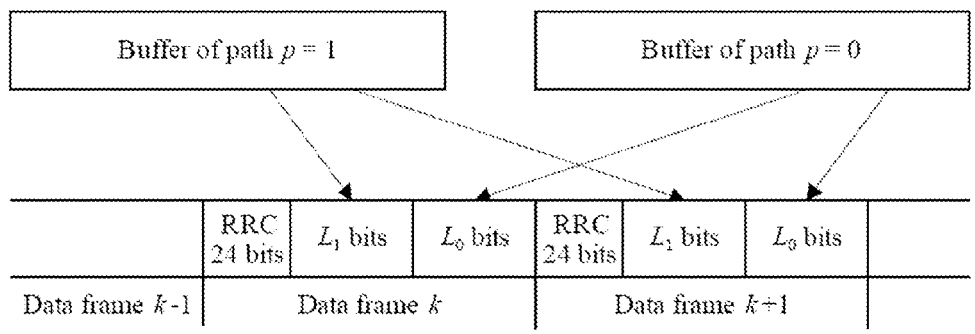

In order to find the correspondence between an idle data sequence and the bit loading of a tone, an IDTU retransmission mechanism may be used (e.g., using the retransmission sublayer in the reference model 200). Two conditions may apply in this case. A first condition is that the overhead channel may be transmitted in a different path (e.g., in the path 0 with the IDTU in path 1), or mapped to different subcarriers from the data sequences. Refer to FIG. 5A, for example, which shows multiplexing of RRC and latency paths for ITUT-T G.993.2. Each DTU may comprise a plurality of frames such as frames k−1, k, and k+1 as shown in FIG. 5A, and each frame may comprise a header and payload. In a data frame, a 24-bit RRC is followed by an overhead channel transmitted in $L_0$, which in turn is followed by an IDTU transmitted in $L_1$. Refer to FIG. 5B, for another example, which shows multiplexing of RRC and latency paths for ITUT-T G.992.3 and G.992.5. In each data frame, a 24-bit RRC is followed by an IDTU transmitted in $L_1$, which in turn is followed by an overhead channel transmitted in $L_0$.

A second condition is that the data sequence in an IDTU may have an one-to-one relation to the bit loading of tones. That is, each tone may have its corresponding special data sequence. In a system request (e.g., retransmission request from a receiver), a DTU and a DMT symbol may be aligned with a certain defined ratio. For example, the ratio (denoted as S*Q) may be aligned as 0.5, 1, 2, 3, or 4. A ratio of 2 indicates that the number of bits in the $L_1$ portion of the data frame k (shown in FIGS. 5A and 5B) is half of the total number of bits in the data frame k. In the interest of clarity, the descriptions herein may assume a ratio of 1 (that is, one DTU is aligned to one DMT symbol), but it should be understood that other ratios may be similarly employed. For example, the data frame K may contain data that can be carried in a DMT symbol which may last for 256 micro-seconds (µs).

Due to the power saving benefits of transmitting inner constellation points, the present disclosure teaches a procedure to determine a plurality of special data sequences. The special data sequences may be inserted as base data into an IDTU such that essentially all the tones (or most of the tones) can be mapped to inner constellation points (e.g., the four innermost points). Since the procedure in the receiving sides is a near reversal of that in the transmission side, to achieve inner constellation points, a pre-calculation procedure may be conducted in the transmission side to mimic a receiver.

Referring back to FIG. 3, the base data for a PSIDTU may be generated based on a target constellation data array 320. More specifically, the target constellation data array 320 may be created first based on a bit loading table, which may be stored in the transmission system 300. For each bit loading, the target constellation data array 320 comprises a group of inner constellation points. In an embodiment, the target constellation data array 320 may be configured to be the four innermost constellation points (1,1), (−1,1),(−1,−1) and (1,−1). Further, for each tone, one of the inner constellation points in the target constellation data array 320 may be selected randomly or according to a certain selection algorithm. The selected inner point may then be used as a target constellation point for a certain tone.

The selected constellation point from the target constellation data array 320 may be processed sequentially by a Viterbi decoder 322, demapper 324, and a block de-interleaver 326. These steps may resemble a reversal of steps performed by the block interleaver 308, the Trellis encoder 310, and the mapper 312. Further, RS redundant bytes may be removed from the output. In practice, a header for idle cell or codeword may be added to the IDTU, which may help a receiver identify the idle cell or codeword. The addition of the header may be skipped if the IDTU may be indicated or identified using other standard-compliant methods, such as a timeout time stamp (TS) IDTU removal method. If no header is contained, more power saving may be achieved, since the header portion may not be able to be mapped to inner constellation points. The output of the RS decoder 328 (with or without idle cell header) may be further processed by a descrambler 330, which may generate a special data sequence. The special data sequence may be inserted into an IDTU as its base data array.

Since multiple target constellation data arrays 320 may be generated, a special data sequence may be computed for each target constellation data array 320, thereby resulting in a plurality of special data sequences. The plurality of special data sequences may be stored in a memory or buffer of the transmission system 300. It should be understood that the computation of the special data arrays may be conducted off-line or on-line. For example, in the off-line case the special data sequences may be computed beforehand and stored into the transmission system 300. Base data bits may depend on the constellation size of each tone of DMT and FEC parameters. As long as these do not change, the base bits may remain the same. Therefore, after entering showtime, if there is no rate change (e.g., via seamless rate adaptation (SRA)) or no bit swap (BS) among tones, base bits may not need to be updated. In some applications, the bit loading for all tones may be fixed and pre-calculation of the special data sequences may work.

For another example, in the on-line case the special data sequences may be computed once for each connection, and may be dynamically updated, e.g., after each online reconfiguration (OLR). If the bit loading of a tone changes, the base data may be updated or re-calculated until the next bit loading change. Further, note that base data may be calculated not only based on the bit loading, but also other parameters or modules, such as encoders (e.g., Trellis encoder and RS encoder) and scrambler.

Depending on the application, the base data containing the computed special data sequences may be inserted into an IDTU using a variety of methods. FIG. 6 illustrates an exemplary structure of a DTU 600, which is adopted by the ITU-T G.998.4 standard (listed as FIG. 8-2 therein). As shown in FIG. 6, the DTU may comprise a sequence ID, a TS, a number of V padding bytes, a DTU payload, and a CRC at the tail. Since each DTU may be identifiable by the SID and/or the TS, if fixed SID and TS are used, the base data may be inserted directly to an DTU after the DTU framer 302 and before the scrambler 304 (in other words, no need to have SID and TS for each DTU). Note that there may be a switch between the DTU framer 302 and the scrambler 304 to insert either user data or idle data into a DTU. Otherwise, if dynamic SID and TS are used, the SID and TS may be placed in the IDTU first, followed by descrambling on the header. These bytes may be inserted at the beginning of one of the special data sequences to form a PSIDTU. Note that the PSIDTU generated herein may be transmitted as a normal DTU.

As described above, since the contents (instead of format) of DTUs may be changed herein, various functional modules or mechanisms in both a multicarrier transmission system and a corresponding multicarrier receiving system may work without any modification. For example, a timing recovery mechanism may not be affected, as the mechanisms may only involve user data tones. Further, signal to noise ratio (SNR) determination, time domain equalizer (TEQ), OLR, and vectoring for cancellation of crosstalk, may not be affected. It is reasonable to expect that, in a relatively long period of idle traffic, the crosstalk from a subscriber line transmitting PSIDTUs to other neighboring lines may be relatively lower. If vectoring is not used to cancel crosstalk, virtual noise may be applied on a victim line to maintain stability of line conditions.

Figure 7:
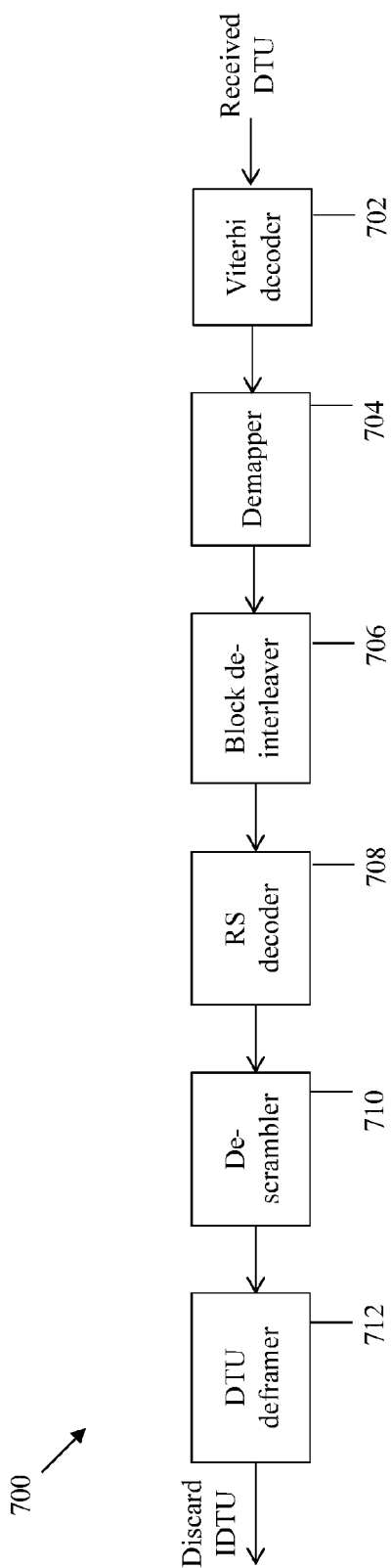
FIG. 7 illustrates an embodiment of a receiving system.

An IDTU generated herein may be transmitted, as a normal DTU, by a multicarrier transmission system (e.g., the transmission system 300) onto a subscriber line. On the other end of the subscriber line, a receiving system or receiver may be configured to receive and identify the IDTU. FIG. 7 illustrates an embodiment of a receiving system 700, which may be implemented as part of a network device. One of ordinary skill in the art will recognize that some aspects of the receiving system are similar to part of the transmission system 300, thus further description will focus on aspects not yet covered. When the receiving system 700 receives a DTU, it may not immediately tell whether the DTU is a user DTU or an IDTU. For proper identification, the received DTU may be sequentially processed by a Viterbi decoder 702, a demapper 704, a block de-interleaver 706, an RS decoder 708, a descrambler 710, and a DTU deframer 712.

Depending on the DSL standard being used and/or the implementation on the transmission side, various methods may be used by the receiving system 700 to determine whether a received DTU is an IDTU. In a first example, an IDTU may be indicated by the transmission side. For some DSL standards such as G. fast, the IDTU or dummy DTU has been defined, thus it can be identified using the standard without any modification on the receiving side. For other DSL standards such as VDSL2, the IDTU has not been defined, thus modifications may be necessary on the receiving side to detect the IDTU (e.g., TS=255 may be reserved to indicate an IDTU). Once detected or identified, the IDTU may be removed or discarded at the δ reference point between a PMS-TC sublayer and a PMD sublayer. In the first example, the IDTU may or may not contain an idle data header, which was added on the transmission side.

In a second example, an IDTU may be detected via a "timeout" value, which may be a large TS value and is recognized by the receiving side as a DTU that shall be discarded. This mechanism has already been adopted by some DSL standards, so no modification may be necessary on the receiving side. In an embodiment, the TS of a PSIDTU constructed on the transmission side may be intentionally set to a "timeout" value, so that the PSIDTU may be automatically recognized on the receiving side. In the second example, the IDTU may or may not contain an idle data header, which was added on the transmission side. Further, the IDTU may be removed or discarded by retransmission queue management on the receiving side.

In a third example, the idle cell or codeword of an IDTU may be detected via its idle header. In this example, the idle data header needs to be added on the transmission side, so that the receiving side may detect the idle data header after deframing the IDTU by the DTU deframer 712. After detection, a TPS-TC sublayer on the receiving side may remove or discard the idle data. This mechanism has already been adopted by some DSL standards, so no modification may be necessary on the receiving side.

Using embodiments disclosed herein, the power consumed in transmitting full or partial IDTUs may be reduced without affecting normal DSL functions on the transmitting side or the receiving side. In an embodiment, the power saving may be realized by software update in a CO, without any hardware modification in either the CO or a corresponding CPE. Further, power saving may be realized in a standard compliant manner, although minor modifications to the standard may further improve power efficiency.

Figure 8:
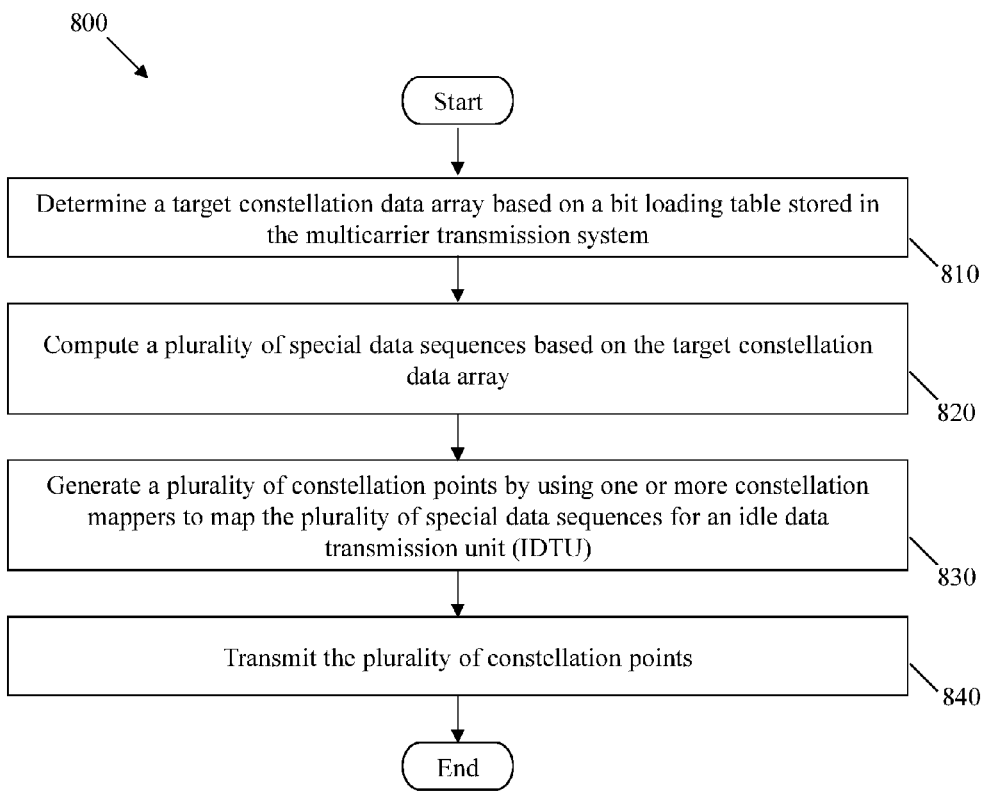
FIG. 8 illustrates an embodiment of a DTU transmission method.

FIG. 8 illustrates an embodiment of a DTU transmission method 800, which may be implemented by a multicarrier transmission system (e.g., the transmission system 300). The method 800 starts in step 810, in which the transmission system may determine a target constellation data array based on a bit loading table, which may be stored in the multicarrier transmission system. The bit loading table may specify the number of bits on each of a plurality of subcarriers. The target constellation data array comprises one or more innermost constellation points and contains no outer constellation points. In an embodiment, the target constellation data array comprises four innermost constellation points (1,1), (−1,1), (−1,−1), and (1,−1). Further, the target constellation data array may be determined beforehand (e.g., stored in a memory before operation) or adaptively during operation by the transmission system.

In step 820, the method may compute a plurality of special data sequences based on the target constellation data array. Note that "based on" as used herein may indicate a partial, complete, direct, or indirect dependence. Thus, the computation of the special data sequences may be indirectly based on the target constellation data array, since intermediate steps may be involved. For example, the computation of the special data sequence may comprise the use of a Viterbi decoder, a demapper, a block interleaver, and a descrambler, in sequence. In an embodiment, computing a special data sequence in the plurality of special data sequences may be based on an innermost constellation point selected from the target constellation data array.

In step 830, the method may generate a plurality of constellation points by using one or more constellation mappers to map the plurality of special data sequences for an IDTU. The plurality of special data sequences have been computed, in step 820 prior to the mapping, such that the plurality of constellation points are essentially inner constellation points. Each of the inner constellation points may reside in a constellation diagram that corresponds to one of the plurality of subcarriers used by the IDTU. The constellation diagram (can be any of a plurality of constellation diagrams corresponding to the subcarriers) may comprise a number of inner constellation points and a number of outer constellation points, with the inner constellation points being closer from an origin of the constellation diagram than the outer constellation points.

In step 840, the method may transmit the plurality of constellation points, directly or indirectly to a receiving system. It should be understood that the method 800 may only include a portion of steps necessary for data transmission. For example, other steps such as scrambling, interleaving, generation of additional constellation points for an overhead channel, transmission of the overhead channel, etc., may be incorporated into the method 800 wherever appropriate. In the interest of conciseness, variations are not illustrated exhaustively herein.

Figure 9:
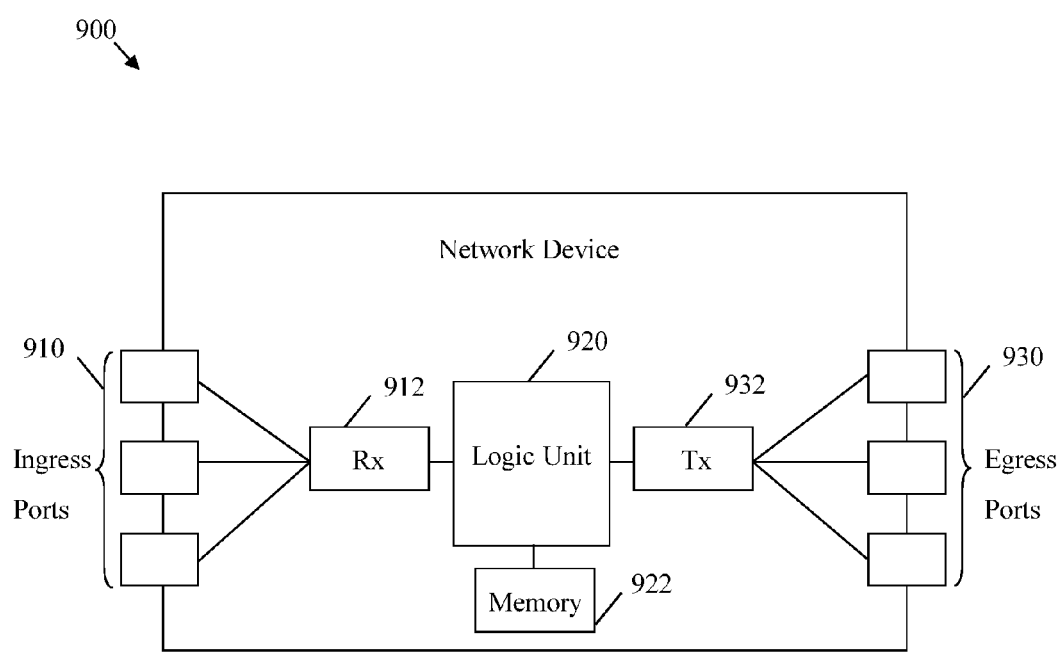
FIG. 9 illustrates an embodiment of a network device.

FIG. 9 illustrates an embodiment of a network device or unit 900, which may be configured to work as a transmission system or receiving system disclosed herein. The network device 900 may comprise one or more ingress ports 910 coupled to a receiver 912 (Rx), which may be configured for receiving DTUs comprising packets or frames, objects, options, and/or type length values (TLVs) from other network devices. The network device 900 may comprise a logic unit or processor 920 coupled to the receiver 912 and configured to process the packets or otherwise determine to which network components to send the packets. The logic unit or processor 920 may be implemented using hardware or a combination of hardware and software. The network device 900 may further comprise a memory 922, in which a bit loading table and/or a target constellation data array may be stored. The network device 900 may also comprise one or more egress ports 930 coupled to a transmitter 932 (Tx), which may be configured for transmitting DTUs, objects, options, and/or TLVs to other network components. The logic unit or processor 920, the receiver 912, and the transmitter 932 may also be configured to implement or support at least part of any of the schemes and methods described above, such as the DTU transmission method 800.

Figure 10:
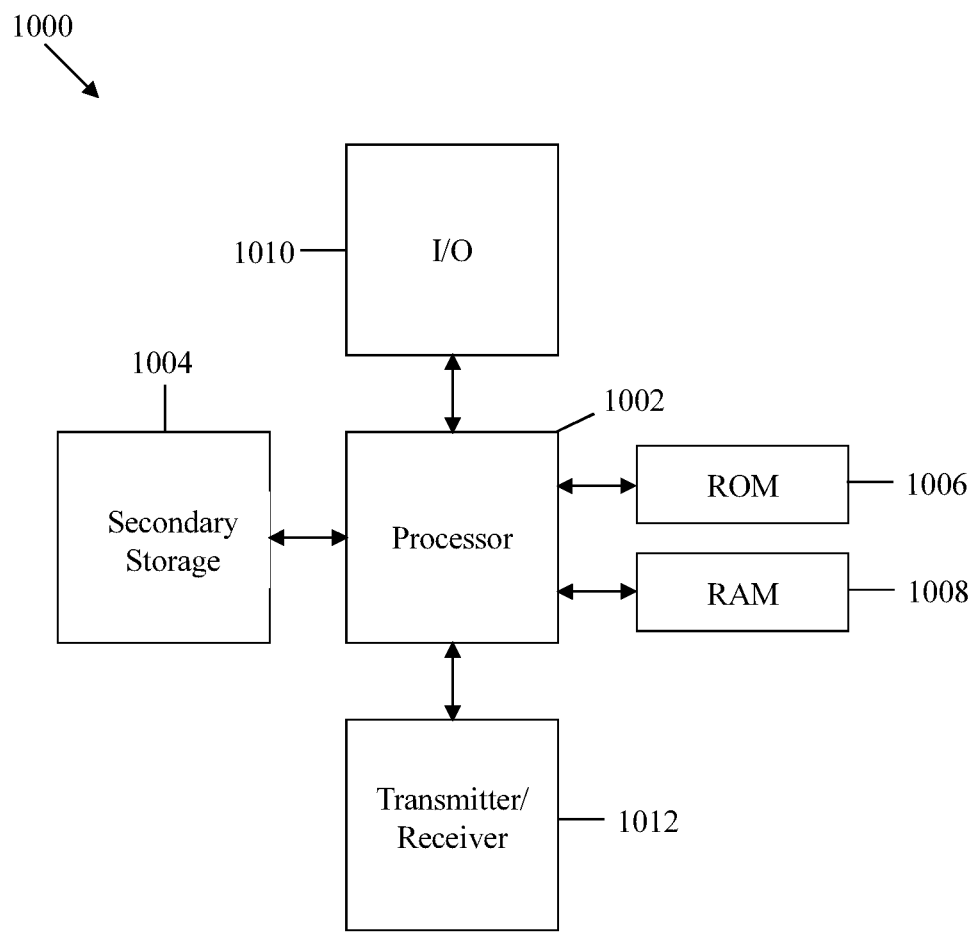
FIG. 10 illustrates an embodiment of a computer system.

The schemes described above may be implemented on a network component, such as a computer or network component with sufficient processing power, memory resources, and network throughput capability to handle the necessary workload placed upon it. FIG. 10 illustrates an embodiment of a computer system or network node 1000 suitable for implementing one or more embodiments of the systems disclosed herein, such as the multicarrier transmission system 300 and the receiving system 700 described above.

The computer system 1000 includes a processor 1002 that is in communication with memory devices including secondary storage 1004, read only memory (ROM) 1006, random access memory (RAM) 1008, input/output (I/O) devices 1010, and transmitter/receiver (transceiver) 1012. Although illustrated as a single processor, the processor 1002 is not so limited and may comprise multiple processors. The processor 1002 may be implemented as one or more central processor unit (CPU) chips, cores (e.g., a multi-core processor), field-programmable gate arrays (FPGAs), application specific integrated circuits (ASICs), and/or digital signal processors (DSPs). The processor 1002 may be configured to implement at least part of any of the schemes described herein, including the DTU transmission method 800. The processor 1002 may be implemented using hardware or a combination of hardware and software.

The secondary storage 1004 is typically comprised of one or more disk drives or tape drives and is used for non-volatile storage of data and as an over-flow data storage device if the RAM 1008 is not large enough to hold all working data. The secondary storage 1004 may be used to store programs that are loaded into the RAM 1008 when such programs are selected for execution. The ROM 1006 is used to store instructions and perhaps data that are read during program execution. The ROM 1006 is a non-volatile memory device that typically has a small memory capacity relative to the larger memory capacity of the secondary storage 1004. The RAM 1008 is used to store volatile data and perhaps to store instructions. Access to both the ROM 1006 and the RAM 1008 is typically faster than to the secondary storage 1004.

The transmitter/receiver 1012 may serve as an output and/or input device of the computer system 1000. For example, if the transmitter/receiver 1012 is acting as a transmitter, it may transmit data out of the computer system 1000. If the transmitter/receiver 1012 is acting as a receiver, it may receive data into the computer system 1000. Further, the transmitter/receiver 1012 may include one or more optical transmitters, one or more optical receivers, one or more electrical transmitters, and/or one or more electrical receivers. The transmitter/receiver 1012 may take the form of modems, modem banks, Ethernet cards, universal serial bus (USB) interface cards, serial interfaces, token ring cards, fiber distributed data interface (FDDI) cards, and/or other well-known network devices. The transmitter/receiver 1012 may enable the processor 1002 to communicate with an Internet or one or more intranets. The I/O devices 1010 may be optional or may be detachable from the rest of the computer system 1000. The I/O devices 1010 may include a display. The I/O devices 1010 may also include one or more keyboards, mice, or track balls, or other well-known input devices.

It is understood that by programming and/or loading executable instructions onto the computer system 1000, at least one of the processor 1002, the secondary storage 1004, the RAM 1008, and the ROM 1006 are changed, transforming the computer system 1000 in part into a particular machine or apparatus (e.g. a transmission or receiving system having the functionality taught by the present disclosure). The executable instructions may be stored on the secondary storage 1004, the ROM 1006, and/or the RAM 1008 and loaded into the processor 1002 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a multicarrier transmission system, the method comprising:
    generating a plurality of constellation points by using one or more constellation mappers to map a plurality of special data sequences for an idle data transmission unit (IDTU), wherein the plurality of special data sequences are computed prior to the mapping such that the plurality of constellation points are essentially inner constellation points, wherein each of the inner constellation points resides in a constellation diagram that corresponds to one of a plurality of subcarriers used by the IDTU, and wherein the constellation diagram comprises a number of inner constellation points and a number of outer constellation points, with the inner constellation points being closer from an origin of the constellation diagram than the outer constellation points; and
    transmitting, by a transmitter, the plurality of constellation points.

2. The method of claim 1, further comprising:
    prior to generating the plurality of constellation points,
        determining a target constellation data array based on a bit loading table stored in the multicarrier transmission system, wherein the bit loading table specifies the number of bits on each of the plurality of subcarriers, wherein the target constellation data array comprises one or more innermost constellation points and contains no outer constellation points; and
        computing some or all of the plurality of special data sequences based on the target constellation data array.

3. The method of claim 2, wherein computing a special data sequence in the plurality of special data sequences is based on an innermost constellation point selected from the target constellation data array, and wherein the computation of the special data sequence comprises the use of a Viterbi decoder, a demapper, a block interleaver, and a descrambler, in sequence.

4. The method of claim 2, wherein the target constellation data array comprises four innermost constellation points.

5. The method of claim 1, further comprising, prior to generating the plurality of constellation points, directly inserting the plurality of special data sequences into the IDTU without adding any sequence identifier (SID) or time stamp (TS) as an idle header of the IDTU.

6. The method of claim 1, wherein each of the plurality of special data sequences has more than two bits, a number of which is determined by a corresponding subcarrier used by the IDTU, and wherein the plurality of constellation points are all inner constellation points that include one or more innermost constellation points.

7. The method of claim 6, wherein the IDTU comprises a header in addition to the plurality of special data sequences, wherein the header comprises a sequence identifier (SID) and a time stamp (TS).

8. The method of claim 6, wherein the plurality of constellation points are transmitted in a path 1, the method further comprising:
    generating a group of additional constellation points by using at least one mapper to map an overhead channel; and
    transmitting, in a path 0, the group of additional constellation points corresponding to the overhead channel.

9. The method of claim 1, wherein the IDTU comprises user data in addition to the plurality of special data sequences, and wherein the user data is also mapped to at least one constellation point which is transmitted alongside the plurality of constellation points.

10. An apparatus comprising:
    a processor configured to generate a plurality of constellation points by using one or more constellation mappers to map a plurality of special data sequences for an idle data transmission unit (IDTU), wherein the plurality of special data sequences are computed, prior to the mapping, such that the plurality of constellation points consist essentially of inner constellation points, wherein each of the inner constellation points resides in a constellation diagram that corresponds to one of a plurality of subcarriers used by the IDTU, and wherein the constellation diagram comprises a number of inner constellation points and a number of outer constellation points, with the inner constellation points being closer from an origin of the constellation diagram than the outer constellation points; and
    a transmitter coupled to the processor and configured to transmit the plurality of constellation points.

11. The apparatus of claim 10, wherein the processor is further configured to:
    prior to generating the plurality of constellation points,
        determine a target constellation data array based on a bit loading table stored in the multicarrier transmission system, wherein the bit loading table specifies the number of bits on each of the plurality of subcarriers, wherein the target constellation data array comprises one or more innermost constellation points and contains no outer constellation points; and
        compute some or all of the plurality of special data sequences based on the target constellation data array.

12. The apparatus of claim 11, wherein the target constellation data array comprises four innermost constellation points, and wherein computing a special data sequence in the plurality of special data sequences is based on one of the four innermost constellation points.

13. The apparatus of claim 10, wherein the processor is further configured to, prior to generating the plurality of constellation points, directly inserting the plurality of special data sequences into the IDTU without adding any sequence identifier (SID) or time stamp (TS) as an idle header of the IDTU.

14. The apparatus of claim 10, wherein each of the plurality of special data sequences has more than two bits, a number of which is determined by a corresponding subcarrier used by the IDTU, and wherein the plurality of constellation points are all inner constellation points that include one or more innermost constellation points.

15. The apparatus of claim 14, wherein the IDTU comprises a header in addition to the plurality of special data sequences, and wherein the header comprises a sequence identifier (SID) and a time stamp (TS).

16. The apparatus of claim 14, wherein the plurality of constellation points are transmitted in a path 1, wherein the processor is further configured to generate a group of additional constellation points by using at least one mapper to map an overhead channel, and wherein the transmitter is further configured to transmit, in a path 0, the group of additional constellation points corresponding to the overhead channel.

17. The apparatus of claim 10, wherein the IDTU comprises user data in addition to the plurality of special data sequences, and wherein the user data is also mapped to at least one constellation point which is transmitted alongside the plurality of constellation points.

18. A computer program product comprising computer executable instructions stored on a non-transitory computer readable medium such that when executed by a processor cause a network device to:
receive a data transmission unit (DTU) comprising a plurality of constellation points corresponding to a plurality of subcarriers used by the DTU, wherein at least one of the plurality of constellation points is an inner constellation point of a constellation diagram, wherein a data sequence was computed so as to map to the inner constellation point using a constellation mapper, wherein the constellation diagram comprises the inner constellation point and a number of outer constellation points that are farther from an origin point of the constellation diagram than the inner constellation point;
demap the plurality of constellation points to generate a plurality of data sequences;
determine that the DTU is an idle DTU (IDTU); and
discard the IDTU.

19. The computer program product of claim 18, wherein the received DTU further comprises a time stamp (TS) that was set to a timeout value, and wherein the determination of the IDTU is based on the timeout value which is recognizable by the network device.

20. The computer program product of claim 18, further comprising instructions that cause the network device to detect an idle header that was inserted into the DTU, wherein the determination of the IDTU is based on the detected idle header, and wherein the IDTU is discarded by a transport protocol specific-transmission convergence (TPS-TC) sublayer of the network device.

* * * * *